US 6,553,393 B1

(12) United States Patent
Eilbott et al.

(10) Patent No.: US 6,553,393 B1
(45) Date of Patent: Apr. 22, 2003

(54) METHOD FOR PREFETCHING EXTERNAL RESOURCES TO EMBEDDED OBJECTS IN A MARKUP LANGUAGE DATA STREAM

(75) Inventors: Seth Aaron Eilbott, Cedar Park, TX (US); Jeffrey Edward Rodriguez, Sunnyvale, CA (US); Michael John Walker, Austin, TX (US)

(73) Assignee: International Business Machines Coporation, Armonk, NY (US)

( * ) Notice: Subject to any disclaimer, the term of this patent is extended or adjusted under 35 U.S.C. 154(b) by 0 days.

(21) Appl. No.: 09/299,953

(22) Filed: Apr. 26, 1999

(51) Int. Cl.[7] .............................................. G06F 17/21
(52) U.S. Cl. ................... 707/513; 707/501.1
(58) Field of Search ............................... 707/513, 240, 707/501.1, 531

(56) References Cited

U.S. PATENT DOCUMENTS

| | | | | |
|---|---|---|---|---|
| 5,727,220 A | * | 3/1998 | Hohensee et al. | 707/513 |
| 5,765,006 A | * | 6/1998 | Motoyama | 707/514 |
| 5,778,372 A | * | 7/1998 | Cordell et al. | 707/513 |
| 5,826,031 A | * | 10/1998 | Nielsen | 709/207 |
| 5,835,914 A | * | 11/1998 | Brim | 707/513 |
| 5,946,697 A | * | 8/1999 | Shen | 707/513 |
| 5,987,466 A | * | 11/1999 | Greer et al. | 707/501.1 |
| 5,987,510 A | * | 11/1999 | Imai et al. | 709/203 |
| 6,065,024 A | * | 5/2000 | Renshaw | 707/513 |
| 6,067,553 A | * | 5/2000 | Downs et al. | 707/513 |
| 6,067,565 A | * | 5/2000 | Horvitz | 709/218 |
| 6,151,603 A | * | 11/2000 | Wolfe | 707/10 |
| 6,182,116 B1 | * | 1/2001 | Namma et al. | 707/103 R |
| 6,182,133 B1 | * | 1/2001 | Horvitz | 707/8 |
| 6,185,585 B1 | * | 2/2001 | Sequeira | 707/501.1 |
| 6,275,852 B1 | * | 8/2001 | Filepp et al. | 709/220 |
| 6,282,542 B1 | * | 8/2001 | Carneal et al. | 707/10 |
| 6,330,561 B1 | * | 12/2001 | Cohen et al. | 707/10 |
| 6,332,157 B1 | * | 12/2001 | Mighdoll et al. | 707/10 |
| 6,338,096 B1 | * | 1/2002 | Ukelson | 709/246 |
| 6,363,418 B1 | * | 3/2002 | Conboy et al. | 707/10 |

OTHER PUBLICATIONS

Shrikumar, H., et al. "Thinternet: Life at the End of a Tether." Computer Networks and ISDN Systems vol. 27 No. 3: pp. 375–385, Dec. 1994.*

* cited by examiner

Primary Examiner—Stephen S. Hong
(74) Attorney, Agent, or Firm—Jeffrey S. LaBaw; Joseph R. Burwell; David H. Judson

(57) ABSTRACT

A method of outputting a document on a rendering engine in a client in a computer network. The document comprises a markup language data stream having a plurality of references to external resources required by the document. In operation, the document is first retrieved to the client. As the document is received, the rendering engine parses the markup language data stream for a list of external resources. If the list of external resources is present in the markup language data stream, the engine selectively prefetches at least one external resource as the document is output by the rendering engine.

17 Claims, 3 Drawing Sheets

METHOD FOR PREFETCHING EXTERNAL RESOURCES TO EMBEDDED OBJECTS IN A MARKUP LANGUAGE DATA STREAM

BACKGROUND OF THE INVENTION

1. Technical Field

This invention relates generally to information retrieval in a computer network. More particularly, the invention relates to managing references to embedded objects in a markup language (e.g., HTML, PGML, or the like) data stream.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify links to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL.

When the user of the browser specifies a link, the client issues a request to a naming service to map a hostname (in the URL) to a particular network IP address at which the server is located. The naming service returns an IP address that can respond to the request. Using the IP address, the browser establishes a connection to a server. If the server is available, it returns a Web page. To facilitate further navigation, a Web page typically includes one or more hypertext references known as "anchors" or "links." In HTML, each anchor is commonly delineated by a markup language "tag" set "<a href="pathname"></a>", where "pathname" is the path information identifying the location of the linked page or object.

Recently, the computer industry has sought to add computer processing and communications capabilities to devices other than what would normally be considered a traditional computer. Such devices are quite varied and include, for example, personal digital assistants (PDAs), business organizers (e.g., IBM™ WorkPad™ and the 3Com™ PalmPilot™), smartphones, cellular phones, other handheld devices, and the like. For convenience, these devices, as a class, are sometimes referred to as "pervasive computing" clients as they are devices that are designed to be connected to servers in a computer network and used for computing purposes regardless of their location. Pervasive computing clients, however, typically do not support the full function set of an HTML Windows-based client. As a result, transcoding services typically are required to translate information to be rendered on the pervasive client from one source markup language (e.g., HTML) to another markup language (e.g., PGML or Precision Graphics Markup Language, an XML-compliant language).

Markup language data streams typically include numerous references to embedded objects such as images, audio streams, video streams, applets, and other rich media content files. These references can occur anywhere in the markup language data stream, which is text data and is often quite complex. Rendering engines, such as browsers or viewers, process such data streams sequentially to ensure that elements in the stream are interpreted and rendered in the correct context. As a result, such engines cannot quickly discover the embedded references, but rather only identify the references when that part of the stream containing the object reference is parsed for rendering. Thus, it can take a significant amount of time before object references on these pages are discovered and processed. This delay results in slower interpretation and ultimate output of the markup language page content.

The present invention addresses this problem.

BRIEF SUMMARY OF THE INVENTION

In accordance with the invention, a method for prefetching external resources required by a page returned from an origin server begins by processing a markup language data stream to determine whether the stream includes a list of external resources. If so, the routine processes the list and identifies at least one external resource to be prefetched. The external resource is then prefetched to the client rendering engine.

Preferably, the inventive prefetching method is implemented within a pervasive computing client having a rendering engine. The client may be connected to a transcoding proxy server. The proxy server preferably transcodes HTML returned from an origin server, which may be a conventional Web server, while generating the embedded object reference list.

By adding the list of references to external resources in a known place in the markup language data stream returned to the client, the proxy server makes it possible for clients to quickly determine which references are present in the stream. This determination can be made even before the entire data stream has been received at the client. As a result, and in accordance with the invention, a provisioned client, for example, may start one or more additional processing threads to retrieve those resources in parallel with the parsing of the rest of the stream. Thus, one or more resources are prefetched so that they may be available for immediate rendering when discovered during the actual parsing of the data stream that includes those object references.

It is another more general object of the present invention to enhance the processing of a markup language data stream at a client rendering device, such as a browser or viewer.

Still another object of the present invention is to enable a client rendering engine to prefetch given external resources identified in a page returned from an origin server.

Yet another object of the present invention is to provide a mechanism that prefetches external resources required by a markup language page data stream and that makes those resources available immediately when the page is parsed (and the object references to those resources are detected and actually requested).

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
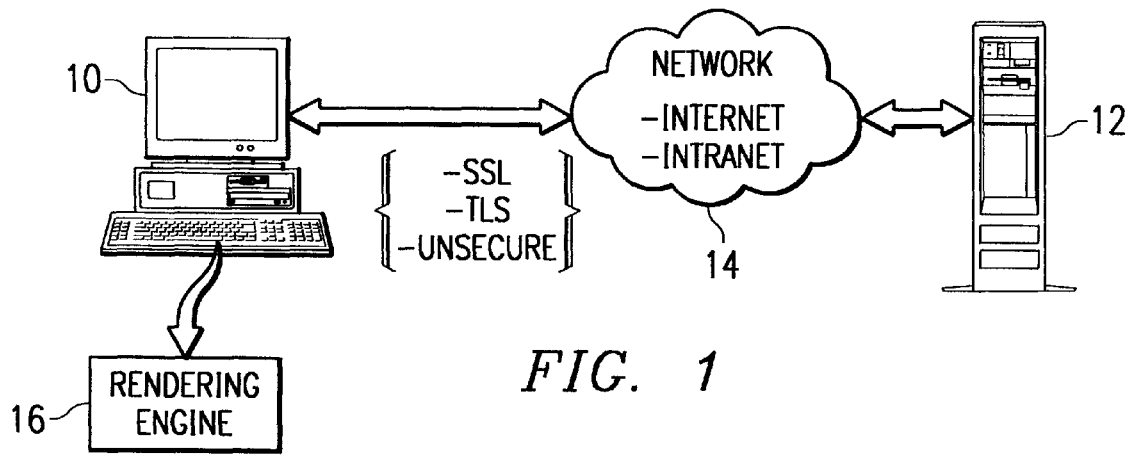
FIG. 1 is a simplified diagram of a known client-server networking environment.

FIG. 1 illustrates a conventional client-server network architecture of the prior art. In this illustration, client 10 communicates to server 12 over a network 14, which may be the Internet, an intranet, a wide area network, a local area network, or the like. Client 10 includes a rendering engine 16 such as a browser, a graphics display viewer, or the like. The rendering engine interprets a data stream conforming to a given markup language and outputs content from that stream. Although not required, client 10 and server 12 may communicate using a network security protocol, such as Netscape's Secure Socket Layer (SSL) protocol or the IETF's Transport Layer Security (TLS) protocol. Generalizing, a client is any application entity that initiates a connection (whether secure or not) to a server. A server is any application entity or program that accepts connections to service requests by sending back responses. Any given program may be capable of being both a client and a server. The server on which a given resource resides or is to be created is sometimes referred to herein as an origin server.

In an illustrative embodiment as will be seen, the client 10 and the server 12 participate in a secure session. Once the session is established, the client has a certificate, which was issued by the origin server, for the purpose of authenticating the client to the origin server. The client may also require the origin server to present a certificate so that it may authenticate the origin server as valid. The above-described functionality is known in the art. The functionality is implemented, for example, in protocols confirming to IETF TLS Version 1.0 and SSL Version 2.0/3.0. Higher level protocols, for example, application protocols (e.g., HTTP, TELNET, FTP and SMTP) normally layer directly on top of the transport (e.g., TCP/IP) layer.

Figure 2:
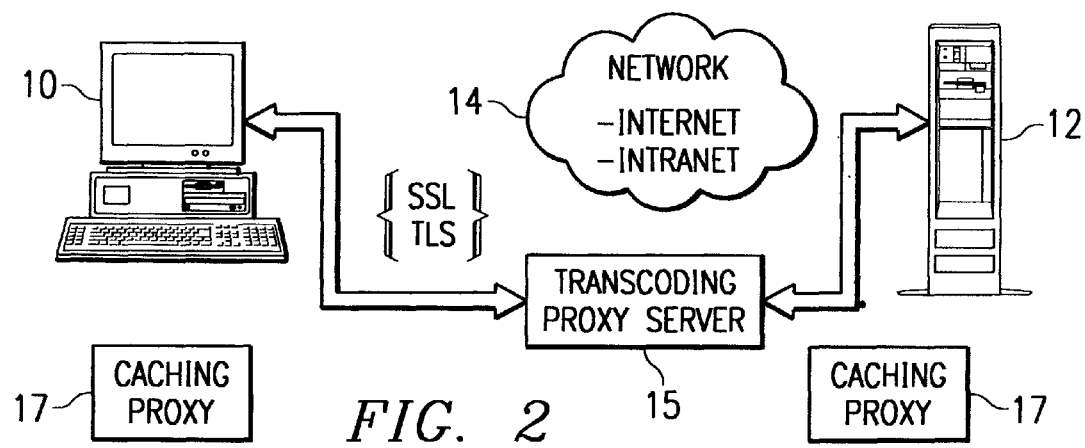
FIG. 2 is a simplified diagram of a client-server networking environment according to the present invention wherein a third party intermediary or proxy participates in a session.

In a representative embodiment of the invention, the present invention is implemented within a transcoding proxy server 15. A caching proxy 17 may also be utilized for the reasons described below. With reference now to FIG. 2, it is assumed that client 10 communicates with origin server 12 over a computer network in the manner previously described. That communication may be a secure session (as described above), although this is not a requirement. One secure technique for enabling the client to communicate with the origin server through the intermediary of the proxy is described in copending application, Serial No. 09/282/, 633, titled "Method For Client Delegation Of Security To A Proxy", to Lita et al., which is assigned to the assignee of the present invention and incorporated herein by reference.

For illustrative purposes, the client 10 is a pervasive computing client that renders pages written in Precision Graphics Markup Language (PGML) while the origin server is a Web server that serves pages written in HTML. Of course, this example should not be taken by way of limitation as the inventive method may be implemented as any given markup language data stream is transcoded from one language to another. Moreover, the inventive process may be carried out separate and apart from any transcoding process. In this example, however, transcoding proxy server 15 is used to transcode the HTML-based data stream issued by the origin server into the PGML-based data stream required by the pervasive computing client. During transcoding, the method of the present invention is implemented as will now be described in more detail below.

Figure 3:
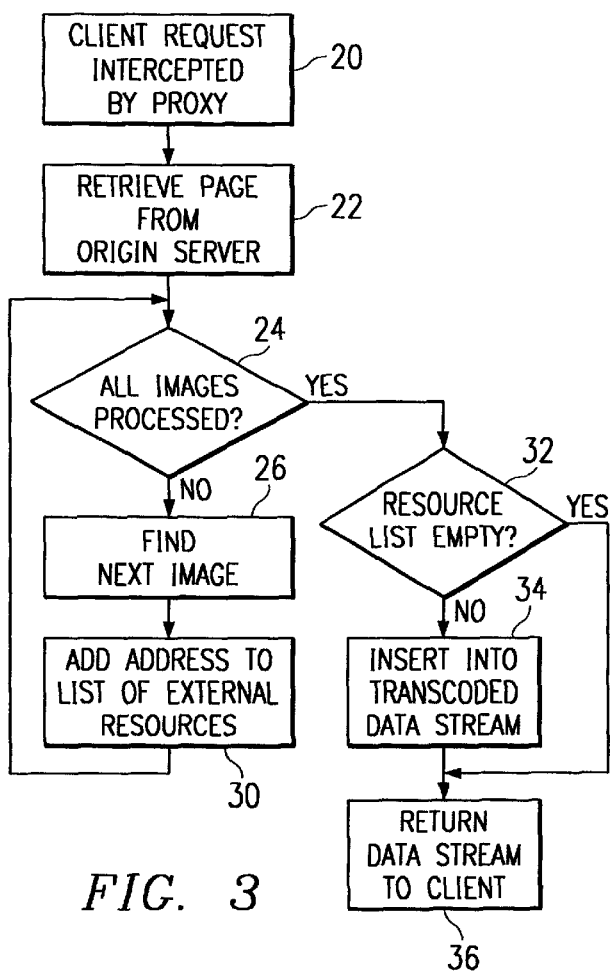
FIG. 3 is a detailed flowchart of the inventive routine for processing a markup language data stream to identify a list of external resources.

FIG. 3 is a flowchart illustrating a preferred technique for generating a list of external resources in the markup language data stream, e.g., the HTML data stream comprising a Web page served from the Web server 12 in FIG. 2. In the illustrative embodiment of FIG. 2, this routine is implemented in computer software, namely as a set of program instructions, executed in a processor running on the proxy server.

The routine begins at step 20 in response to receipt of a client request intercepted by the proxy server. At step 22, the proxy server retrieves a given page from the origin server. The page, in this example, comprises a text-based HTML Web page. In particular, the origin server data stream usually includes a plurality of embedded object references identified by given tags. Of course, the particular tag grammar may depend on the type of object, although in certain markup languages (e.g., the Extensible markup language or XML) more generalized object references are provided. For purposes of illustration, it is assumed that the inventive method generates a list of external image references, although this is not a limitation of the invention of course. To this end, the routine continues at step 24 to test whether all image tags have been processed. (An image is typically set off by a tag, <img src=pathname>, as is well known). If not, the routine continues at step 26 to find the next image tag set. The routine then continues at step 30 to add its address to an internal list. An illustrative example of this step is set forth below. Processing then returns to step 24.

As noted above, the flowchart shown in FIG. 3 is used merely to look for image references. If other external resources are processed, similar functionality is implemented. These resources (or resource types, as the case may be) are identified sequentially or in parallel. According to the invention, the particular type of external resource is not limited. The resource types include, without limitation, images, audio streams, video streams, applets, other rich media file types (Shockwave, Flash, or the like).

When the proxy completes the parsing of the data stream, the outcome of the test at step 24 is positive. The routine then branches to step 32 to test whether the reference list is empty. If not, the routine inserts the list in a given location in the data stream. This is step 34. Preferably, the list is inserted at or near the front of the data stream. Alternatively, the list is inserted in any convenient location before the actual external references in the original stream. Thereafter, or upon a positive outcome of the test at step 32, the routine continues at step 36 to return the stream back to the client. As noted above, the stream is also transcoded during the process so that it may be rendered by the PGML-based rendering engine at the pervasive computing client.

In a preferred embodiment, the external resource list is generated from the (input) markup language data stream received from the origin server but then is positioned in the (output) markup language data stream served back to the client. As noted above, the input and output markup language data streams may comprise two different language formats (e.g., HTML and PGML, HTML and HDML, or the like), or the same language format. This particular sequence of processing is not a requirement of the invention, however. Thus, if desired, the external resource list may be generated from the translated markup source code generated by the transcoding process. Moreover, the invention may also be implemented irrespective of whether the markup language data stream is transcoded. In the latter case, the proxy server may be omitted and the external resource list generated by another application, e.g., a servlet operating on the origin server or some other intermediate server.

Nevertheless, according to a preferred embodiment, the transcoding proxy server 15 generates a list of all (or a portion of the) external resources referenced by the page and includes that list (or some portion thereof) in a known place, preferably near the front of the transcoded data stream. This processing preferably occurs during the translation of the page from one format to another (e.g., HTML to PGML). As will be seen, a client that is aware of this process (or otherwise provisioned) can quickly locate this list and begin to retrieve the specified resources before the rest of the stream is parsed, which results in faster overall processing of the complete page.

The following is a specific example of the inventive process described by the flowchart of FIG. 3. When transcoding HTML to PGML, the proxy server generates a list of the following form (and then places the list immediately before the <pgml>start tag), as follows:

```
<?IMAGE_LIST
   "URL for image 1"
   "URL for image 2"
   - - -?>
```

Representative document source is set forth below for a sample page (long sequences of source not pertaining to the invention have been omitted for brevity, and the important parts of the document are placed in bold, simply to help demonstrate the invention):

```
<?xml version="1.0"?>
<!DOCTYPEpgml [
   <!ENTITY nbsp " ">
   <!ENTITY copy "©">
   <!ENTITY tm "™">
   <!ENTITY rtm "®">
]>
<?IMAGE_LIST
   "default-ibmlogo.gif"
   "default-logo.gif"
?>
<pgml boundingbox="0 0 616 410" textsize="12">
   <group concat= "1 0 0 -1 -0 410">
   ...
   <img clippath="clip1" concat="45 0 -0 -23 212 310
   " x="0" y="0" width ="1" height= "1"
   src="default-ibmlogo.gif"
   <text clippath="clip1" font="Times-Roman"
   concat="1.1667 0-0-1.1667 257 287">  </tex
   <img clippath="clip1" concat="140 0-0-39 264 326"
   x="0" y="0" width="1" height="1"
   src="default-logo.gif"
   ...
   </group>
   ...
</pgml>
```

As can be seen, the generated image list is created by simply collecting a set of the image object references. This list is then positioned near the front end of the transcoded PGML data stream and, in any case, preferably prior to the first actual reference to the image itself. According to another feature of the present invention, the image list generated in this manner may be then used by a client rendering engine to prefetch the external resource, as will now be described.

Figure 4:
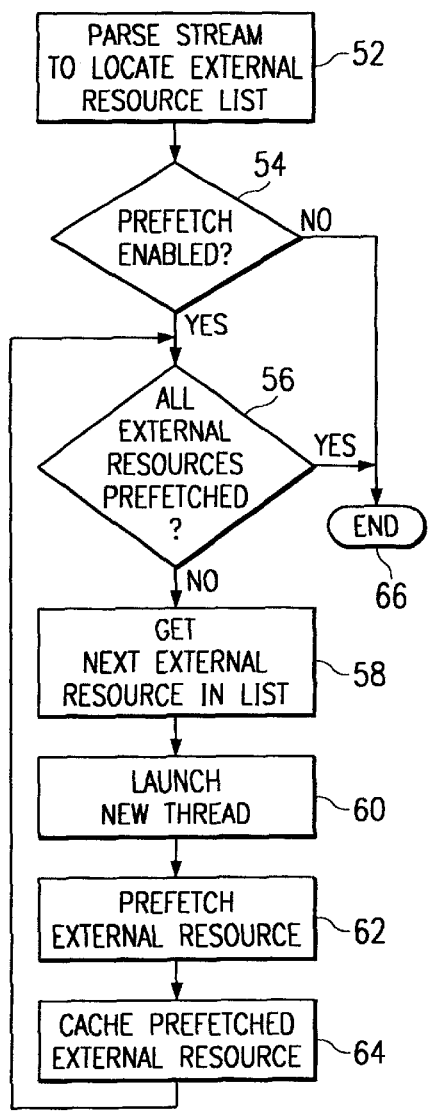
FIG. 4 is a detailed flowchart of the inventive routine for prefetching a set of external resources that have been identified according to the routine of FIG. 3.

FIG. 4 is a flowchart describing the external resource prefetching operation in accordance with a preferred embodiment of the present invention. This functionality assumes that the client has been provisioned to identify the external resource list such as described above and that the markup language data stream including that list has been returned to the client rendering engine. The routine begins at step 52 with the rendering engine (or other program providing the inventive functionality) parsing the stream to locate the external resource list. At step 54, a test is run to determine whether the prefetch option has been selected. (Alternatively, if the prefetch option is a default option, step 54 tests to determine whether a given external reference type is to be prefetched.) If the outcome of the test at step 54 indicates that an external resource is to be prefetched, the routine continues at step 56 to test whether all external resources in the list (or a given sublist) have been prefetched. If not, the routine continues at step 58 to get the next external resource in the list. At step 60, the routine preferably launches a new processing thread (although this is not required). The external resource is then prefetched at step 62. At step 64, the prefetched external resource is cached so that it may be available to the rendering engine when the object reference to the resource is later reached (as the rendering engine parses the data stream). If all of the resources have been prefetched, the outcome of the test at step 56 is positive and the routine terminates at step 66.

As can be seen, because the external resource list (or some portion thereof) is located at the front end of the markup language data stream, one or more of the external references may be selectively prefetched to the rendering engine before they are-required to be output to complete the page rendering. Indeed, one of ordinary skill will appreciate that the rendering engine need not even process the whole data stream to see a given external resource.

Although it is preferred to place the list of external resources in the data stream served to the client, the proxy server may communicate the list to the client in some other manner. Thus, for example, the list may be communicated over a separate connection, or by associating a pointer early in the data stream to a separate list file. Alternatively, the proxy server may simply send the list before the transcoded data stream.

If desired, the external resource list may be processed by the client-side code (or the proxy server) to prefetch given resources according to a priority scheme. Thus, for example, a larger file may be pre-fetched prior to a smaller one. Alternatively, a first external resource type (e.g., defining an image file) may be prefetched prior to a second external resource type (e.g., defining a video stream). Thus, according to the invention, the external resources list may optionally include a priority value or attribute that identifies a relative priority for prefetching the resource with respect to other resources (or resource types). Thus, for example, a first resource may have a prefetch priority value=high while a second resource may have a prefetch priority value=low. When the markup language data stream including the resource is processed at the client, the first resource is prefetched before the second resource (assuming there are local resources available to prefetch both). One of ordinary skill will appreciate that the levels of priority may be quite varied to provide robust prefetching depending on the available local resources.

Although not meant to be limiting, one technique for prefetching a given external resource is for the client rendering engine to establish a communication link to the server on which the external resource is hosted. This may be accomplished, for example, by opening a second HTTP connection between the client and the server according to the HTTP 1.1 application protocol. A preferred technique is to use the caching proxy illustrated in FIG. 2.

In particular, once the proxy server 15 generates the list of external resources, the proxy server itself may initiate the retrieval of one or more of the external resources. A given resource retrieved by the transcoding proxy server is then cached in the caching proxy 17. When the client prefetches the given resource, the resource may be served from the caching proxy, instead of the origin server. Thus, in one embodiment, the proxy server parses the data stream received from the origin server, generates the list of external resources, and begins to retrieve one or more of those resources. In this manner, the transcoding proxy server 15 seeds the caching proxy 17 for the client. The proxy server may also process the external resource if desired.

The present invention provides numerous advantages. By processing a resource list that is separate from the embedded references, the client can retrieve the objects ahead of time. This allows the objects to be processed in parallel while the stream is still being received, reducing the total amount of time required to process the complete markup language page. In the preferred embodiment as previously described, the above-described functionality is implemented within a proxy server, preferably a server that provides transcoding services between a given client and an origin server. By adding the list of references to external resources in a known place in the data stream, the transcoding proxy server makes it possible for clients to quickly determine which references are present. Provisioned clients (namely, those devices that perform the functionality described in the flowchart of FIG. 4) can, for example, start additional threads to retrieve those resources in parallel with the parsing the (rest of) the stream; in that case, the resources are prefetched so that they are already available when discovered during parsing. This improves the performance of those clients by decreasing the amount of time it takes them to process the stream.

Several variants of the invention have been described above. In addition, if the references to the external resources in the data stream include additional attributes, the proxy server may use such information to refine the resource list. Thus, in the images example above, given object references may identify the size of the image. Using the size information, the proxy server may selectively determine which images should be prefetched. Of course, attributes other than size (e.g., reference type, characteristics, etc.) may be used by the proxy server to generate the list.

Figure 5:
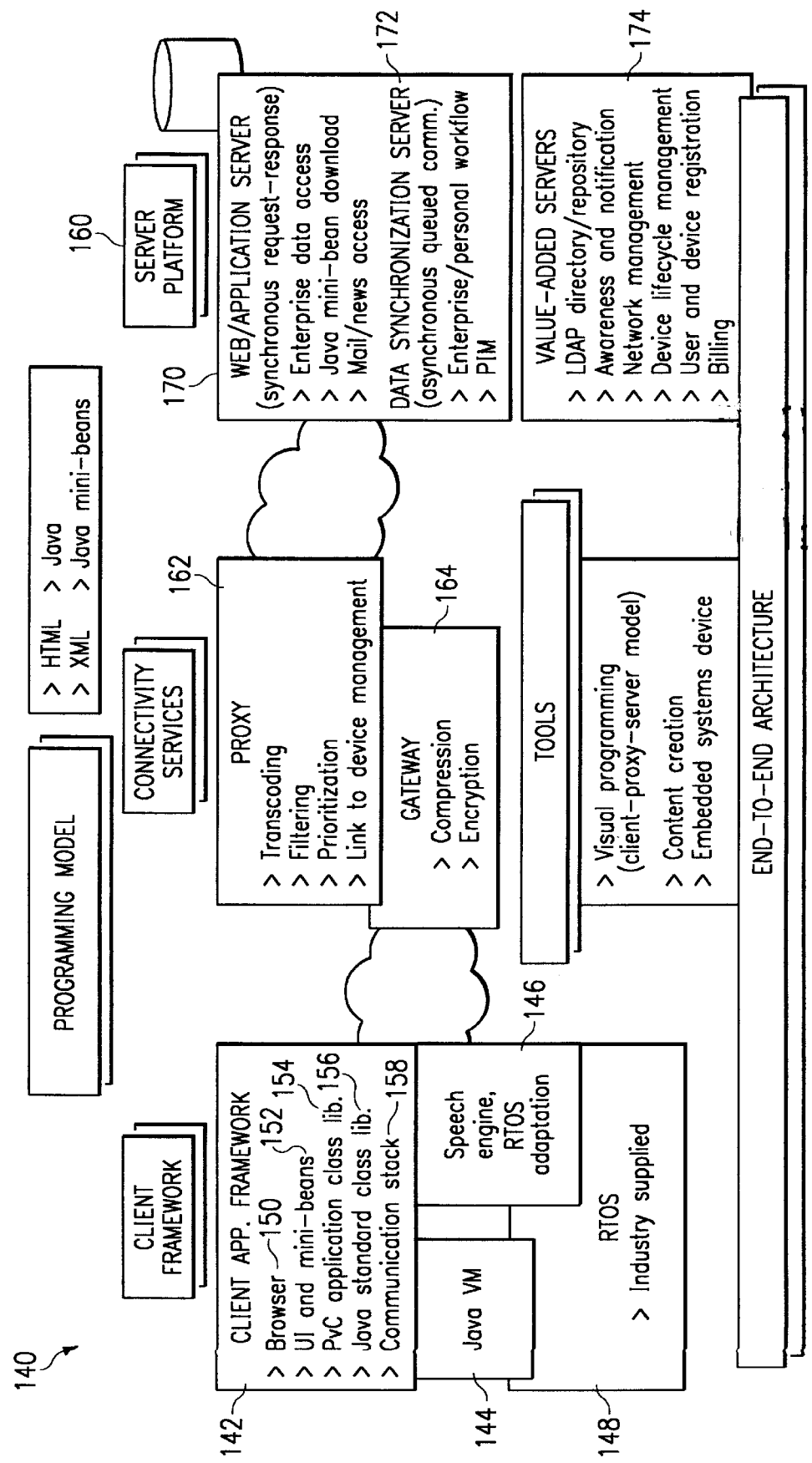
FIG. 5 is a block diagram of a pervasive computing client-server architecture in which the present invention may be implemented.

In the illustrative embodiment, the client is a pervasive computing client that is x86-, PowerPC™- or RISC-based, that includes an operating system such as WindRiver VXWorks™, QSSL QNXNeutrino™, or Microsoft Windows, and that includes a browser or other rendering engine as previously described. Referring now to FIG. 5, a representative pervasive computing device comprises client stack 140 including a number of components, for example, a client application framework 142, a virtual machine 144, a speech engine 146, and an industry-supplied operating system (RTOS) 148. The client application framework 142 typically includes a browser 150, a user interface 152, a pervasive computing client application class library 154, a standard Java class library 156, and a communication stack 158. The pervasive computing client connects to a server platform 160 via a connectivity service 162.

At its lower level, the connectivity service 162 includes a gateway 164 that provides compression and encryption functions. The gateway implements a network security protocol that has been extended according to the method of the present invention. The upper level of the connectivity service 162 is the proxy 166 that provides transcoding as well as the inventive functionality of the present invention.

The server platform 160, namely, the origin server, may be of several different types. The platform 160 may be a Web/application server 170 (a synchronous request-response type server) or a data synchronization server 172 174 (an asynchronous queued communication type server). The basic functions are each such server type are illustrated. Alternatively, the platform 160 may be a value-added server that provides additional services such as LDAP directory/repository, awareness and notification, network management, device life cycle management, user and device registration, or billing.

As noted above, the invention may be implemented in software executable in a processor, namely, as a set of instructions (program code) in a code module resident in the random access memory of the computer. Preferably, the functionality described in FIG. 3 is implemented within the proxy server while the functionality described in FIG. 4 is implemented within a provisioned client. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "client" should be broadly construed to mean any computer or component thereof directly or indirectly connected or connectable in any known or later-developed manner to a computer network, such as the Internet. The term "server" should also be broadly construed to mean a computer, computer platform, an adjunct to a computer or platform, or any component thereof. Of course, a "client" should be broadly construed to mean any machine, device, application or resource that requests a file or object, and "server" is the entity that downloads the file or object. Moreover, as previously discussed, the invention may be used or practiced in any type of Internet Protocol (IP) client, not just within an HTTP-complaint client having a browser. Finally, the references to HTML, PGML or other markup languages should not be taken by way of limitation as the inventive functionality may be readily implemented with respect to any existing text-based markup language (e.g., SGML, XML, and the like) or any later-developed language. Finally, the reference to a list of external resources refers to any text format including, without limitation, a linked list, an array, or other data structure.

Having thus described our invention, what we claim as new and desire to secure by letters patent is set forth in the following claims:

What is claimed is:

1. A method of outputting a document, the method comprising:

retrieving the document at a client from a server, wherein the document comprises a markup language data stream having a plurality of references to external resources required by the document, wherein the markup language data stream comprises a list of external resources that is positioned in the data stream before all of the references to external resources prior to receipt of the markup language data stream at the client, wherein each external resource in the list of external resources is prioritized according to a priority scheme, and wherein the priority scheme allows for prioritization based on resource type;

parsing the markup language data stream for the list of external resources;

determining whether prefetching of external resources is enabled prior to prefetching any external resources in the list of external resources; and if prefetching of external resources is enabled, selectively prefetching at least one external resource as the document is output by the rendering engine.

2. The method as described in claim 1 wherein, according to the priority scheme, a given first external resource is prefetched before a given second external resource.

3. The method as described in claim 1 wherein, according to the priority scheme, a given first external resource type is prefetched before a given second external reference type.

4. The method as described in claim 1 wherein the at least one external resource is prefetched by having the rendering engine start an additional processing thread.

5. The method as described in claim 1 wherein the rendering engine is a browser.

6. The method as described in claim 1 wherein the rendering engine is a graphics display viewer.

7. A method of outputting a document on a rendering engine in a client, the document comprising a markup language data stream having a plurality of references to external resources required by the document, comprising the steps of:

retrieving the document;

parsing the markup language data stream for a list of external resources;

if the list of external resources is present in the markup language data stream, determining whether prefetching of external resources is enabled prior to prefetching any external resources in the list of external resources;

if prefetching of external resources is enabled, selectively prefetching a given external resource;

caching the given external resource;

determining whether a reference to the given external resource has been reached in the markup language data stream;

if so, retrieving the given external resource from cache, if available; and outputting the given external resource.

8. The method as described in claim 7 wherein the given external resource is prefetched by having the rendering engine start an additional processing thread.

9. The method as described in claim 7 wherein the rendering engine is a browser.

10. The method as described in claim 7 wherein the rendering engine is a graphics display viewer.

11. The method as described in claim 7 wherein the given external resource has a priority value associated therewith.

12. A method for enhancing the performance of a client rendering engine, comprising the steps of:

receiving a markup language data stream defining a page;

outputting the page on the client rendering engine;

determining whether prefetching of external resources is enabled prior to prefetching any external resources in an external resource list; and if prefetching of external resources is enabled, asynchronously prefetching a given external resource in the page based on the external resource list selectively positioned in the markup language data stream.

13. The method as described in claim 12 further including the step of storing the given external resource.

14. The method as described in claim 13 further including the step of retrieving and outputting the given external resource when a reference to that resource is encountered in the markup language data stream.

15. The method as described in claim 12 wherein the external resource list is positioned in the data stream before an initial object reference to one of the external resources in the list.

16. A computer program product in a computer-readable medium, comprising:

a rendering engine for receiving a markup language data stream and outputting a page;

program instructions for determining whether prefetching of external resources is enabled prior to prefetching any external resources in a list of external resources; and program instructions for asynchronously prefetching external resources required by the page according to the a list of external resources included in the markup language data stream if prefetching of external resources is enabled.

17. A computer connectable to a computer network having at least one origin server, the computer comprising:

a processor;

a rendering engine for receiving a markup language data stream and outputting a page;

program instructions for determining whether prefetching of external resources is enabled prior to prefetching any external resources in a list of external resources; and program instructions for asynchronously prefetching external resources required by the page according to the list of external resources included in the markup language data stream if prefetching of external resources is enabled.

* * * * *